United States Patent [19]

Vicic et al.

[11] 4,120,838

[45] Oct. 17, 1978

[54] POLYPHOSPHAZENE WIRE COVERINGS

[75] Inventors: John Charles Vicic, Painesville, Ohio; Kennard Anthony Reynard, Adrian, Mich.

[73] Assignee: The Firestone Tire & Rubber Company, Akron, Ohio

[21] Appl. No.: 821,018

[22] Filed: Aug. 1, 1977

[51] Int. Cl.$^2$ .................... C08L 85/02; C08L 43/02
[52] U.S. Cl. ........................ 260/29.1 SB; 260/37 R
[58] Field of Search ............ 252/63.5; 260/2 P, 37 R, 260/29.1 SB

[56] References Cited

U.S. PATENT DOCUMENTS

| | | | |
|---|---|---|---|
| 3,867,341 | 2/1975 | Kyker | 260/45.75 R |
| 4,026,839 | 5/1977 | Dieck et al. | 260/37 R X |
| 4,073,825 | 2/1978 | Dieck et al. | 260/2.5 R X |
| 4,076,658 | 2/1978 | Dieck et al. | 260/2.5 R |

*Primary Examiner*—Lewis T. Jacobs

[57] ABSTRACT

Wire covering compositions are described with excellent electrical properties and an outstanding combination of physical properties. The compositions comprise polyphosphazenes to which fillers, particularly $Mg(OH)_2$ and $Al_2O_3.3H_2O$ have been added and which include as a processing aid alkylarylsiloxanes.

9 Claims, No Drawings

POLYPHOSPHAZENE WIRE COVERINGS

This invention relates to a non-flammable polyphosphazene wire covering. More particularly it relates to compositions which exhibit a combination of physical and electrical properties and a processability which make them particularly suited to use as insulating wire coverings.

Fires in buildings or on board ships or in other similar structures in which smoke may accumulate present a serious threat to men and material, as a result of both the heat generated by the fire and the smoke which accompanies the destruction of material exposed to the fire and its heat. In enclosed areas, burning electrical insulation can be a major hazard. When ignited, conventional thermoplastic electrical insulation often drips and aids in propagating the fire. .If the insulation is based on polyvinylchloride or other halogen-containing material, the smoke generated may be toxic and corrosive, with danger to life and to equipment which it encounters.

Polyphosphazenes offer a number of advantages over conventional electrical insulation materials. Polyphosphazenes which contain a high mole concentration of aromatic substituent groups are inherently non-burning, even when they do not contain halogen. They can be vulcanized with peroxides or sulfur, dependent on the type and concentration of cure site present. Cross-linking minimizes dripping during combustion. Also, physical characteristics of polyphosphazenes can be varied over a wide range by changes in the type and mole concentration of side groups present.

One object of this invention is to provide polyphosphazene formulations which are suitable as insulation covering on wires and which are inherently non-burning.

Another object of the invention is to provide electrically insulating compositions based on polyphosphazene polymers and which contain fillers in amounts which do not impair the electrically insulating characteristics of the composition.

Still a further object of the invention is to provide compositions which are readily processable as coatings for wires.

Another object is to provide wire covering compositions which do not contain halogen containing materials.

These and other objects will be pointed out or will be apparent from the description of the invention which follows in which preferred embodiments are described which are not intended to limit the invention in any way.

Essentially the compositions of this invention comprise the following:
  Polyaryloxyphosphazene(s);
  Fillers;
  Processing Aid(s);
  Curing Agent(s);
and any other additives added for special properties.

The polyphosphazenes preferred in the practice of this invention are polyaryloxyphosphazene copolymers of the kinds described in U.S. Pat. No. 3,883,451, issued May 13, 1975, and particularly preferred polymers are those in which the groups appended to the phosphorus atoms are phenoxy and alkylphenoxy, either p-alkyl or m-alkyl, and particularly m-ethylphenoxy or p-ethylphenoxy, and in which the mol ratio of phenoxy to m- or p-alkylphenoxy groups is between 2:1 and 1:3 and is preferably between 3:2 and 2:3. A small amount of unsaturated cure site may also be present as described in U.S. Pat. Nos. 3,702,833 and 3,970,533 issued Nov. 14, 1972 and July 20, 1976, respectively.

For wire covering or other applications in which the electrical properties of the composition are significant, both the quantity and the nature of the fillers which can be utilized in the composition is limited. Filler contents should not exceed 125 parts by weight for each 100 parts by weight of polymer and should preferably be 100 parts or less, per 100 parts of polymer. In selecting the filler, attention must be paid to its effect on the electrical properties of the composition. Fillers which are preferred for the present invention are magnesium hydroxide $Mg(OH)_2$ and hydrated alumina $Al_2O_3 \cdot 3H_2O$ and mixtures of the two.

The processing aid is required in the compositions of this invention to facilitate the compounding of the polyphosphazene with the filler or combination of fillers and with the curing agent. The preferred processing aid is a silica filled methylvinylphenylpolysiloxane which is a commercial product sold as Silane Base 6587. Other aryldimethylpolysiloxanes with either vinyl or phenyl or other aryl substituents have also been found suitable. The amount of processing aid should be between 1 and 125 parts per 100 parts of polymer and is preferably present in the amount of 3–11 parts by weight per 100 parts of polyphosphazene with about 10 parts by weight being particularly preferred. As shown in the data which follows, the preferred content of Silane Base 6587 gives a considerable improvement in processing, virtually eliminating mill stick and nerve and has no adverse effect on other properties (smoke, L.O.I., physical properties, electrical properties). With no Silane Base 6587 (or a similar processing aid) the stocks are very nervy and have considerable mill stick and are very difficult to process on the mill.

Curing is conventionally achieved by means of known peroxides, dicumyl peroxide being preferred. The amount of curing agent is generally up to about 2 parts per 100 parts of phosphazene polymer and is readily determinable for any specific composition.

In addition to the filler(s), processing aid(s) and curing agents(s), other additives which may be present in the polyphosphazene wire-covering compositions of this invention include antioxidants, stabilizers, silicone oils and lead compounds.

Antioxidants which have been found beneficial in the compositions of this invention include conventional antioxidants employed in rubber compounds for tires and high molecular weight phenolic antioxidants. Of these, the high molecular weight phenolics, particularly multi-functional high molecular weight phenolics such as octadecyl 3-(3', 5'-di-t-butyl-4'-hydroxyphenyl) propionate and tetrakis [methylene 3'(3',5',-di-t-butyl-4' hydroxyphenyl) propionate] methane.

Other stabilizers which are useful as a special purpose additive are the metal 8-hydroxyquinolate complexes described in U.S. Pat. No. 3,867,341 issued Feb. 18, 1975.

Silicone oils are another processing aid which can be added to the compositions of this invention. Between about 1 and 5 parts by weight per 100 parts of phosphazene polymer, (preferably about 3 parts by weight) was found to improve the processability of the composition.

Finally in order to improve the moisture resistance and the electrical properties of the wire covering compositions, various lead compounds have been found to be effective, including both inorganic compounds such as red lead and organic compounds such as lead stearate.

The following tables set forth specific formulated compositions to illustrate the invention.

TABLE I

PHYSICAL PROPERTIES OF 1:1 [(C₆H₅O)₂PN-(4-C₂H₅C₆H₄O)₂PN]ₙ POLYPHOSPHAZENE WIRE COVERING COMPOUNDS

| Formulation | 2838-24 | 2383-25 |
|---|---|---|
| Polyphosphazene | 100 | 100 |
| Hydrated Alumina | 30 | — |
| Precipitated Hydrated Silica | 20 | 20 |
| Silane Treated, Superfine Hydrated Alumina | — | 30 |
| Silica Filled, Peroxide Curable, Methylphenylvinyl Siloxane | 10 | 10 |
| 40% Active Dicumyl Peroxide on Nonhydrated Aluminum Silicate Clay | 1 | 1 |
| Monsanto Rheometer Data (175° C, 1° Arc, 100 Hz) | | |
| t₂(min.) | 2.6 | 2.8 |
| t₉₀(min.) | 5.0 | 4.2 |
| $M_L$ (in lbs.) | 12.0 | 11.0 |
| $M_{HF}$ (in lbs.) | 15.5 | 16.5 |
| Mill Processability | excellent | excellent |
| Limiting Oxygen Index | 31 | 29 |
| Stress-Strain (ASTM D 3196) Cure: 5 min. at 175° C | | |
| 50% Modulus (psi) | 200 | 250 |
| 100% Modulus (psi) | 790 | 930 |
| Tensile Strength (psi) | 900 | 1070 |
| Elongation % | 135 | 110 |
| Shore A Hardness | 75 | 79 | properties were not as good as those obtained with higher molecular weight copolymers.

The electrical properties of the foregoing formulations were next determined. Dielectric constant values were determined according to ASTM D 150 using 2½ × 2½ × ~0.50 inch vulcanizate specimens coated with conductive silver paint (1.5 inches diameter electrodes). A jig was used to insure electrodes were painted uniformly and were accurately aligned. Painted specimens were dried 1 hour at 80° C. in an oven to remove volatiles and were then equilibrated at 22° C. and 50% relative humidity.

Test equipment consisted of a General Radio capacitance bridge, type 716-C; a Hewlett-Packard 141A oscilliscope; and an Interstate Electronics F34 function generator. Capacitance was measured at 10 KHz and 100 KHz and the dielectric constant was calculated according to the formula:

$$K = \frac{C_x}{C_o} = \frac{4.45\, t\, C_x}{A} \text{ (ppf, in.)}$$

where
$C_o$ = air capacitance between two electrodes
$C_x$ = sample capacitance
$A$ = area of electrodes
$t$ = specimen thickness.

No corrections for fringing were used. Accurate capac-

TABLE II

PHYSICAL PROPERTIES OF 2:3 [(C₆H₅O)₂PN-(4-C₂H₅C₆H₄O)₂PN]ₙ POLYPHOSPHAZENE WIRE COVERING COMPOUNDS

| Formulation | 2883-36 | 2883-37 | 2883-41 | 2883-47 | 2383-48 | 2383-49 | 2383-50 |
|---|---|---|---|---|---|---|---|
| Polyphosphazenes | 100 | 100 | 100 | 100 | 100 | 100 | 100 |
| Precipitated Hydrated Silica | 20 | 20 | 20 | — | — | — | — |
| Hydrated Alumina, Smallest Particle Size Commercially Available | 30 | 50 | — | — | — | — | — |
| Magnesium Hydroxide | — | — | 30 | 25 | 50 | 50 | 50 |
| Silane Treated, Superfine Hydrated Alumina | — | — | — | 50 | 50 | 50 | 50 |
| Phenyl Silicone Oil | — | — | — | — | 3 | — | — |
| Silica Filled, Peroxide Curable, Methylphenyl Vinyl Siloxane | 10 | 10 | 10 | 10 | 10 | 10 | 10 |
| 40% Active Dicumyl Peroxide on Nonhydrated Aluminum Silicate Clay | 1 | 1 | 1 | 1 | 1.5 | 1 | 1 |
| Monsanto Rheometer Data (175° C, 1° Arc, 100 Hz) | | | | | | | |
| t₂ (min.) | 2.5 | 2.7 | 2.4 | 3.0 | 2.0 | 2.7 | 2.9 |
| t₉₀ (min.) | 5.0 | 5.2 | 5.1 | 4.4 | 5.1 | 4.0 | 4.2 |
| $M_L$ (in lbs.) | 9.0 | 12.0 | 13.0 | 5.5 | 6.0 | 7.5 | 6.9 |
| $M_{HF}$ (in lbs.) | 14.5 | 19.0 | 20.0 | 9.5 | 14.5 | 10.0 | 9.7 |
| Mill Processability | Excellent | Excellent | Excellent | Excellent | Excellent | Excellent | Excellent |
| Limiting Oxygen Index | 29 | 30 | 29 | 34 | 35 | 40 | 40 |
| Stress-Strain (ASTM D3196T) Cure: 5 min. at 175° C | | | | | | | |
| 50% Modulus (psi) | 100 | 140 | 160 | 115 | 205 | 220 | 160 |
| 100% Modulus (psi) | 390 | 485 | 560 | 590 | 620 | 680 | 570 |
| Tensile Strength (psi) | 930 | 1025 | 1005 | 960 | 940 | 1025 | 780 |
| Elongation % | 210 | 170 | 160 | 160 | 180 | 155 | 165 |
| Shore A Hardness | 62 | 67 | 65 | 65 | 67 | 69 | 67 |

The 2:3 [(C₆H₅O)₂PN-(4-C₂H₅C₆H₄O)₂PN]ₙ copolymers used in previous formulations were all medium to high molecular weight materials ([η] 1.3 to 2.3 dl/g). Another formulation, based on a low molecular weight 2:3 copolymer ([η] 0.8 dl/g) was evaluated. This material exhibited excellent release, surface uniformity, and no indication of nerve on the mill at 40°-65° C. Processability was superior to any comparable material. Mold flow was outstanding and cured specimens were uniform with extremely smooth surfaces, which is desirable for production of a wire covering. Stress-strain itance readings at 1 KHz or lower were not possible because of the small sample size used, the low capacitance of the test specimens, and the reduced sensitivity of the bridge at this frequency.

Vulcanized specimens 6 × 6 × ~0.20 inches were tested for di-electric strength following the procedures of ASTM D149. An Industrial Instruments di-electric breakdown tester, Model PA-5-SO, with a voltage rise of 500 volts per second was used with electrodes 1 inch in diameter and 1 inch in length.

Cured 1:1 $[(C_6H_5O)_2PN-(4-C_2H_5C_6H_4O)_2PN]_n$ copolymer, without fillers or additives other than peroxide, had a dielectric constant of 3.2. This value increased to between 4 and 5 by addition of 50-100 phr filler, depending on the type used.

Table III

Dielectric Constant and Dielectric Strength of Polyphosphate Wire Covering Compounds (ASTM D150)

|         | Dielectric Constant | | Dielectric Strength |
|---------|--------|---------|-------------------|
|         | 10 KHz | 100 KHz | volts/mil         |
| 2383-24 | 4.2    | 4.1     | 650               |
| 2383-25 | 4.1    | 4.0     | 815               |
| 2383-36 | 4.9    | 4.7     | 985               |
| 2383-37 | 5.1    | 4.9     | 975               |
| 2383-41 | 4.9    | 4.8     | >800              |
| 2383-47 | 4.1    | 4.0     | >800              |
| 2383-48 | 4.7    | 4.6     | >800              |
| 2383-49 | 4.6    | 4.5     | >800              |
| 2383-50 | 4.6    | 4.5     | >800              |

Wire covering compositions prepared with 1:1 $[(C_6H_5O)_2PN-(4-C_2H_5C_6H_4O)_2PN]_n$ copolymer and 2:3 $[(C_6H_5O)_2PN-(4-C_2H_5C_6H_4O)_2PN]_n$ copolymer were tested for smoke properties in a National Bureau of standards (NBS smoke density chamber. Test data are given in Table IV.

Combination of hydrated silica with hydrated alumina, silane treated or untreated, substantially reduced smoke density and weight loss of 1:1 $[(C_6H_5O)_2PN-(4-C_2H_5C_6H_4O)_2PN]_n$ copolymer wire covering compounds, but affected the electrical properties adversely.

duced much change in original stress-strain properties at the concentration used (0.5 phr).

The control, as expected, had a pronounced drop in elongation with a sharp rise in tensile strength after 72 hours at 125° C. These properties remained fairly stable thereafter to 196 hours. Test specimens gradually discolored from off-white to dark brown as exposure time increased. No stress-strain data were taken for control samples aged at 150° C. The 72 hour specimens were still flexible but could not be mounted on the test fixture. Extremely hard, brittle samples were obtained after 144 hours. Discoloration at 150° C. was more rapid and pronounced than at 125° C.

Irganox 1076 proved to be an effective stabilizer at 125° C. Retention of stress-strain properties was excellent with only small variations in tensile strength or elongation with increasing exposure time. Tensile strength initially increased at 72 hours followed by a gradual decline with time. Elongation showed small to moderate gains (10-30%) during the same period. No discoloration was evident after 196 hours. Stabilization at 150° C. was evident up to 72 hours as shown by the test data. However, after 144 hours the test specimens were too brittle to test and discoloration was severe.

Compositions 2383-47E stabilized with Irganox 1010, had given results similar to 2383-47D after aging at 125° C. Tensile strength retention followed the same general pattern while elongation initially increased and then slowly fell. At 150° C., Irganox 1010 was superior to Irganox 1076 as a stabilizer. Mechanical properties of 2383-47E remained virtually unchanged after 144 hours at 150° C. Also, despite a decrease in tensile strength Table IV NBS Smoke Chamber Results of Polyphosphazene Wire Covering Materials Flaming

| Vulcanizate No. | 2383-24 | 2383-2 | 2383-36 | 2383-37 | 2383-41 | 2383-47 | 2383-48 | 2383-49 |
|---|---|---|---|---|---|---|---|---|
| $D_{mc}$ | 270 | 230 | 306 | 213 | 211 | 121 | 96 | 64 |
| $t_{0.9} D_m$ (min.) | 2.91 | 3.75 | 1.11 | 1.77 | 1.23 | 3.07 | 1.75 | 4.21 |
| $t_{D.16}$ (min.) | 0.56 | 0.53 | 0.31 | 0.37 | 0.52 | 0.79 | 0.82 | 0.91 |
| Weight (gms.) | 11.5 | 12.8 | 6.7 | 5.3 | 7.3 | 5.4 | 5.6 | 5.1 |
| Thickness (mm) | 1.52 | 1.72 | 0.93 | 0.63 | 0.94 | 0.67 | 0.66 | 0.59 |
| % Weight Loss | 29 | 28 | | | | | | |

Nonflaming

| $D_{mc}$ | 166 | 214 | 219 | 182 | 38 | 52 | 26 | 22 |
| $t_{0.9}$ (min.) | 8.10 | 11.48 | 7.52 | 6.6 | 5.6 | 21.2 | 20.0 | 23.7 |
| $t_{D.16}$ (min.) | 1.78 | 1.77 | 1.18 | 1.18 | 1.97 | 11.2 | 8.0 | 16.0 |
| Weight % (gms.) | 11.2 | 13.3 | 4.7 | 5.1 | 7.2 | 5.0 | 5.4 | 5.5 |
| Thickness (mm) | 1.47 | 1.67 | 0.65 | 0.61 | 0.82 | 0.56 | 0.64 | 0.66 |
| % Weight Loss | 22 | 19 | | | | | | |

Stabilization studies at 125° C. and 150° C. were carried out with compositions formulated with 2:3 $[(C_6H_5O)_2PN-(4-C_2H_5C_6H_4O)_2PN]_n$ copolymer. Data are compared in Table V with the same basic formulation to which multi-functional high molecular weight phenolic compounds (Irganox 1076 and 1010) which are high temperature antioxidants were added. Irganox 1076 and Irganox 1010 possess high molecular weight and low vapor pressure at elevated temperatures. These factors are vital to long term antioxidant efficiency at the test temperatures studied. Neither antioxidant proand elongation, test specimens were still reasonably flexible and only moderately discolored after 196 hours aging. Specimens tested at 125° C. had no sign of discoloration.

These data indicate unstabilized 2:3 $[(C_6H_5O)_2PN-(4-C_2H_5C_6H_4O)_2PN]_n$ copolymer compositions have limited utility at 125° C. in air (perhaps to 200 hours). Useful lifetime at 150° C. is less than 72 hours. However, materials stabilized with high temperature antioxidants have good stability in air at 125° C., retaining their strength and flexibility. Optimum stability at 150° C. is obtained with Irganox 1010 but only to about 200 hours exposure.

TABLE V
Antioxidant Evaluation in Polyphosphazene Wire Covering Compounds Formulation 2383-47

| | phr |
|---|---|
| Polymer | 100 |
| Silane Treated Hydrated Al₂O₃ | 50 |
| Mg(OH)₂ | 25 |
| Silicone Base 6587 | 10 |
| Dicumyl Peroxide on Clay | 1 |
| Antioxidant | as shown |

| | 125° C | | | | 150° C | | |
|---|---|---|---|---|---|---|---|
| HOURS: | 0 | 72 | 144 | 196 | 72 | 144 | 196 |
| 2383-47 (Control) | | | | | | | |
| 50% Modulus (psi) | 115 | — | — | — | | | |
| 100%; Modulus (psi) | 590 | — | — | — | | | |
| Tensile Strength (psi) | 960 | 1840 | 2215 | 2025 | Unable to Test | | |
| Elongation % | 160 | 30 | 30 | 30 | | | |
| 2383-47D (0.5 Irganoz 1076) | | | | | | | |
| 50% Modulus (psi) | 90 | 100 | 130 | 130 | 125 | Unable | |
| 100% Modulus (psi) | 410 | 460 | 510 | 385 | 585 | to | |
| Tensile Strength (psi) | 930 | 1175 | 1070 | 895 | 995 | Test | |
| Elongation % | 190 | 200 | 200 | 220 | 150 | | |
| 2383-47E (0.5 Irganox 1010) | | | | | | | |
| 50% Modulus (psi) | 105 | 115 | 140 | 140 | 140 | 140 | — |
| 100% Modulus (psi) | 415 | 535 | 565 | 480 | 535 | 565 | — |
| Tensile Strength (psi) | 960 | 1270 | 1100 | 845 | 985 | 1040 | 790 |
| Elongation % | 195 | 200 | 185 | 180 | 185 | 185 | 30 |

It will be seen that wire covering compositions with an excellent combination of electrical and physical properties have been described. In order to obtain these properties many of the common reinforcing fillers are disqualified, such as carbon blacks, silica and others. Further the amount of filler should not exceed the amount of polyphosphazene, by weight between 50 and 125 parts by weight of filler per 100 parts of polymer being suitable. In order to meet anticipated low smoke and flame requirements and the electrical requirements preferred fillers are Mg(OH)₂ and Al₂O₃.3H₂O and combinations of the two in proportions between 1:4 and 4:1.

Other polysiloxanes may be used in place of the dimethylvinylphenylsiloxane which is preferred.

Having now described preferred embodiments of the invention, it is not intended that it be limited except as may be required by the appended claims.

We claim:

1. A composition suitable as a fire resistant low smoking, electrically insulating covering for electrically conducting metal wires comprising for each 100 parts by weight of polyaryloxyphosphazene polymer:
    (1) between 50 and 125 parts by weight of a hydrated filler selected from the group consisting of Mg(OH)₂, Al₂O₃.3H₂O and mixtures thereof;
    (2) an effective amount of a curing agent;
    (3) between 3 and 11 parts by weight of a polysiloxane as a processing agent; and
    a compound of lead in an amount which is effective to improve the moisture resistance of the composition.

2. The composition of claim 1 wherein the amount of filler is about equal to the weight of the polymer.

3. The composition of claim 1 wherein the curing agent is a peroxide.

4. The composition of claim 1 wherein the processing aid is a polydimethylsiloxane containing both phenyl and vinyl groups.

5. The composition of claim 1 including in addition an effective amount of an antioxidant.

6. The composition of claim 5 wherein the antioxidant is a high molecular weight phenolic compound.

7. The composition of claim 1 including in addition between about 0.05% and 5.0% by weight of a stabilizer consisting of a metal 8-hydroxyquinolate.

8. The composition of claim 1 including in addition between 1 and 5 parts by weight of an aryl silicone oil.

9. A metal wire covered with the composition of claim 1.

* * * * *

UNITED STATES PATENT OFFICE
CERTIFICATE OF CORRECTION

Patent No. 4,120,838   Dated October 17, 1978

Inventor(s) John Charles Vicic and Kennard Anthony Reynard

It is certified that error appears in the above-identified patent and that said Letters Patent are hereby corrected as shown below:

In Table IV, under title indicated as "Flaming" the column headed "2383-2" should be -- 2383-25 --.

Signed and Sealed this

Second Day of October 1979

[SEAL]

Attest:

RUTH C. MASON
Attesting Officer

LUTRELLE F. PARKER
Acting Commissioner of Patents and Trademarks